(12) United States Patent
Elendt

(10) Patent No.: US 9,219,400 B2
(45) Date of Patent: Dec. 22, 2015

(54) ACTUATOR UNIT OF A SLIDING CAM SYSTEM HAVING A LATCHING DEVICE

(71) Applicant: Schaeffler Technologies AG & Co. KG, Herzogenaurach (DE)

(72) Inventor: Harald Elendt, Altendorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 281 days.

(21) Appl. No.: 13/888,908

(22) Filed: May 7, 2013

(65) Prior Publication Data

US 2013/0293035 A1 Nov. 7, 2013

(30) Foreign Application Priority Data

May 7, 2012 (DE) .......................... 10 2012 207 476

(51) Int. Cl.
*H02K 33/00* (2006.01)
*H01F 7/16* (2006.01)

(52) U.S. Cl.
CPC .............. *H02K 33/00* (2013.01); *H01F 7/1607* (2013.01)

(58) Field of Classification Search
CPC ................................ H02K 33/00; F16H 25/18
USPC ........................ 310/12.32, 25, 30, 36, 37, 71; 123/90.11
See application file for complete search history.

(56) References Cited

U.S. PATENT DOCUMENTS

| | | | |
|---|---|---|---|
| 5,022,359 A * | 6/1991 | Erickson et al. ............ | 123/90.14 |
| 2002/0050751 A1* | 5/2002 | Hashimoto et al. ............. | 310/71 |
| 2007/0199527 A1* | 8/2007 | Engel et al. ................ | 123/90.11 |
| 2010/0005646 A1* | 1/2010 | Manubolu et al. .............. | 29/596 |
| 2013/0098318 A1* | 4/2013 | Nendel ....................... | 123/90.11 |
| 2013/0199330 A1* | 8/2013 | Heinemann ..................... | 74/567 |

FOREIGN PATENT DOCUMENTS

| | | |
|---|---|---|
| DE | 10 2010 048 005 | 4/2012 |
| WO | WO2011061218 | 5/2011 |
| WO | WO 2012/045515 | 4/2012 |

* cited by examiner

*Primary Examiner* — Hanh Nguyen
(74) *Attorney, Agent, or Firm* — Davidson, Davidson & Kappel, LLC

(57) ABSTRACT

An actuator unit of a sliding cam system includes an actuator pin for moving sliding cam units into different axial positions using at least one sliding groove on the circumference of the sliding cam units, which interacts with the actuator pin and which has at least one ejection ramp, the sliding cam system including an electromagnet unit, the actuator pins being loaded in the direction of the sliding cam unit by actuating springs, slidingly guided in a housing, the actuator pins being operatively connected to latching elements are guided in a shifting gate, spring-loaded and actuatable by the electromagnet unit, a return-stroke spring of the shifting gate being supported on the housing and loading the shifting gate in the insertion direction of the actuator pins, and the force of the return stroke spring is greater than the force of the actuating spring or springs.

21 Claims, 3 Drawing Sheets

ACTUATOR UNIT OF A SLIDING CAM SYSTEM HAVING A LATCHING DEVICE

This claims the benefit of German Patent Application DE 10 2012 207 476.7, filed May 7, 2012 and hereby incorporated by reference herein.

An actuator of a sliding cam system, which may be fixed to an internal combustion engine or to a component thereof, includes at least one actuator pin for moving sliding cam units of the sliding cam system into different axial positions with the aid of at least one sliding groove on the circumference of the sliding cam units, which interacts with the actuator pin on the circumference of the sliding cam unit and which has at least one ejection ramp, the sliding cam system including an electromagnet unit, the actuator pins being loaded in the direction of the sliding cam unit by actuating springs which are slidingly guided in a housing of the actuator unit, and the actuator pins or at least one component connected thereto is/are operatively connected to a latching device whose latching elements are guided in a shifting gate, the shifting gate being spring-loaded, on the one hand, and being actuatable by the electromagnet unit, on the other hand.

BACKGROUND

A corresponding actuator unit for reciprocating internal combustion engines is known from DE 10 2010 048 005 A1, related to WO 2012/045515, both of which are hereby incorporated by reference. This actuator unit has a lockable latching device, by means of which the actuator pins may be fixed in the inner position facing away from the sliding cam units. The movement of the actuator units into this latching position is carried out exclusively by the ejection ramp, which moves the one or more actuator pin(s) into the inner position against the actuating springs. The lockable latching devices may be released by an electromagnet unit in such a way that the actuating springs move the actuator pins in the direction of the sliding cam units and operatively connect them to the sliding grooves. Since the lockable latching devices are fixed in one place, the ejection ramp must move the one or more actuator pin(s) to the inner position of the actuator unit until the latching device is reached. If this is not done, the actuator pins are unable to be fixed in the inner position, so that they slide on the jacket of the sliding cam unit and may collide with the sliding grooves or edges thereof.

SUMMARY OF THE INVENTION

It is an object of the present invention to eliminate the disadvantages described above and to modify the actuator unit in such a way that the actuator pins are fixed in the inner position even if the stimulus by the ejection ramp is insufficient to move the actuator pins to the inner position. The modification is to be accomplished using simple, cost-effective means.

The present invention provides that the spring(s) of the shifting gate are designed as return stroke spring(s) which are supported on the housing and load the shifting gate in the insertion direction of the actuator pins, and by the fact that the force of the return stroke spring(s) is greater than the force of the actuating spring or springs.

If the one or more actuator pin(s) is/are pushed back out of the sliding groove via the ejection ramp, the shifting gate may be inserted all the way over the latching elements by the interaction of the return stroke spring and the latching device and lift the actuator pins from the high circle of the sliding cam system.

The latching elements, which are preferably designed as spheres, are operatively connected to a recess in the one or more actuator pin(s), on the one hand, and to a preferably conical chamfer, on the other hand.

The chamfer is situated on a bushing surrounding the shifting gate and the bushing is guided or fixed in the housing. If the one or more actuator pin(s) is/are then pushed back out of the sliding groove by the ejection ramp, the latching elements or the spheres may be inserted into the recess in the actuator pin by the interaction of the return stroke spring and the chamfer of the bushing, the force of the return stroke spring lifting the actuator pin and inserting it up to an inner stop in the actuator unit.

In another embodiment of the present invention, it is proposed that the shifting gate has a dome which may be contacted by an armature of the electromagnet unit, the armature of the electromagnet unit being able to move the shifting gate against the force of the return stroke spring. The force buildup of the armature causes the shifting gate to move axially in the exiting direction of the one or more actuator pin(s). Once the armature has come to a stop at a disk, which is described in greater detail below, the shifting gate and the latching elements or spheres have moved so far that the latching elements are able to exit due to the action of force of the actuating spring or springs on the actuator pin in interaction with a chamfered edge on the recess and the chamfer on the bushing. The actuator pin may then enter the sliding groove on the sliding cam unit by the action of force of the actuating spring(s).

It is furthermore proposed that a disk which is guided in a fixing flange and has an opening for the dome is provided inside the actuator unit at the connection to the bushing. The disk is used as a limiting stop for the armature.

It is furthermore proposed that the housing of the actuator unit is fixed in the fixing flange, preferably with the aid of a press-fit connection.

The coil, armature guide and a connector of the electromagnet unit are preferably designed as a single production unit by a plastic injection molding operation.

The production unit may be situated in an outer housing which is preferably fixed on the fixing flange with the aid of caulking.

The electromagnet unit from the hydraulic switching valves of the applicant and may be used for the actuator unit without any structural changes.

BRIEF DESCRIPTION OF THE DRAWINGS

The present invention is explained below on the basis of the drawings, which illustrate an exemplary embodiment of the present invention in simplified form.

DETAILED DESCRIPTION

Figure 1:
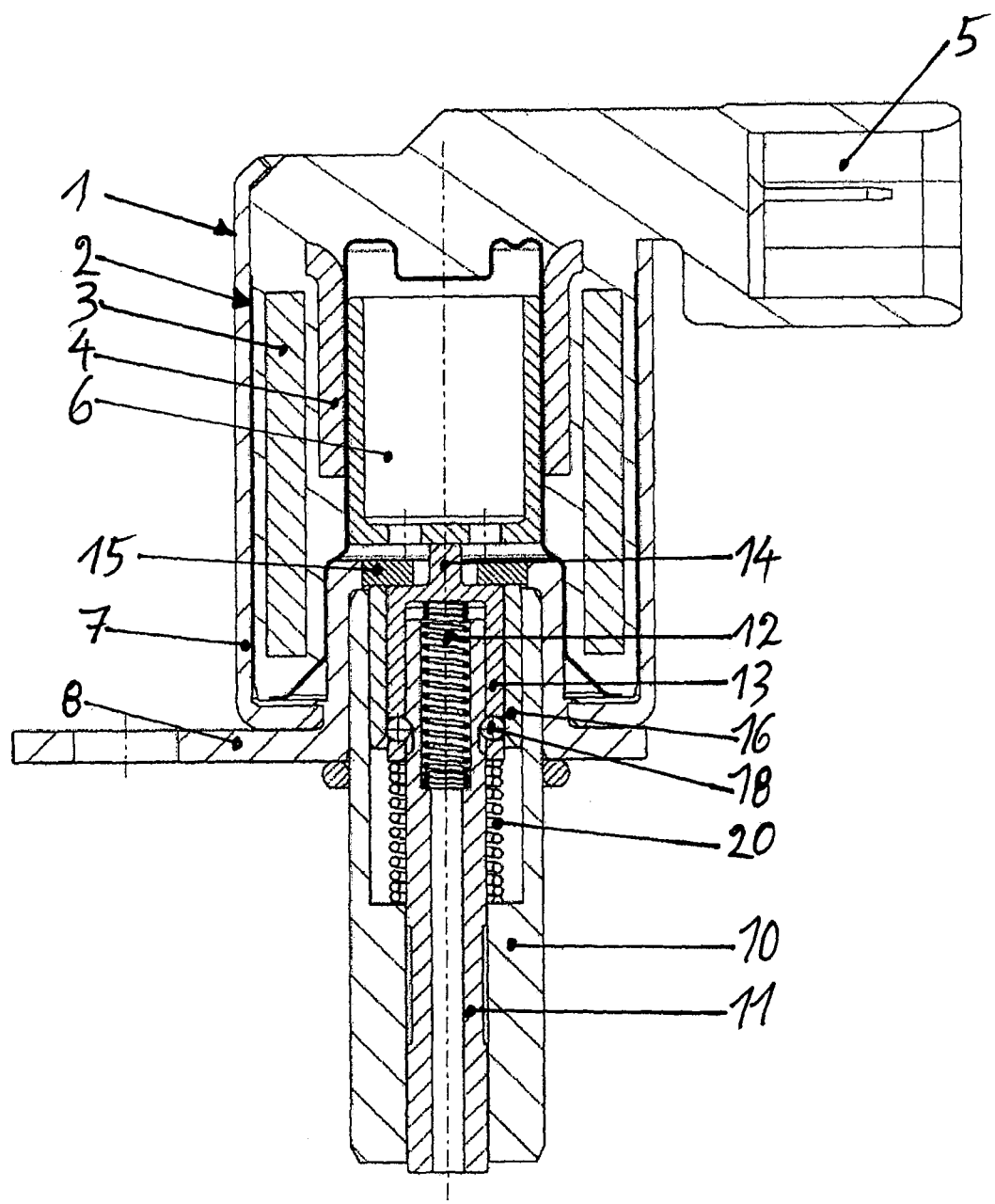
FIG. 1 shows a sectional view of an actuator unit having an inserted actuator pin.

In FIGS. 1 through 4, an actuator unit generally identified by reference numeral 1 is specifically illustrated, which has an electromagnet unit 2 into which a coil 3, an armature guide 4, an armature 6 movable within armature guide 4 and a connector 5 are integrated. Electromagnet unit 2 is surrounded by an outer housing 7, which is fixed to a fixing flange 8, preferably caulked thereto. Fixing flange 8 may be fixed to a component of a cylinder head of a reciprocating internal combustion engine, which is not illustrated, preferably screwed thereto and sealed against it. Fixing flange 8 has an extension into which a housing 10 of actuator unit 1 is inserted or introduced by press-fitting. An actuator pin 11 is slidingly guided in housing 10, has a hollow design and includes an actuating spring 12 in its interior, which is designed as a pressure spring. Actuating spring 12 is supported on actuator pin 11, on the one hand, and on a shifting gate 13, on the other hand, which has a cup-shaped design. A dome 5, which points in the direction of armature 6 and may be actuated thereby, is molded centrally on shifting gate 13 on the opposite side of actuating spring 12. A disk 15, which forms both a stop for shifting gate 13 and a stop for armature 6, is situated on the inner end of housing 10. A bushing 16, which is fixed to housing 10, is provided within housing 10 and radially outside shifting gate 13. On its end facing away from disk 15, bushing 16 has a chamfer 17, which is designed in the shape of a cone and which narrows in the direction of shifting gate 13. Openings are provided near chamfer 17 in shifting gate 13, into which latching elements 18 designed as spheres are inserted, which are guided within shifting gate 13, movable in the radial direction. A recess 19, which has a conical design at least on the edge facing electromagnet unit 2, is provided in the outer wall of actuator pin 11. A return stroke spring 20, which is supported on shifting gate 13, on the one hand, and on housing 10, on the other hand, is provided on the outer edge of shifting gate 13.

Figure 2:
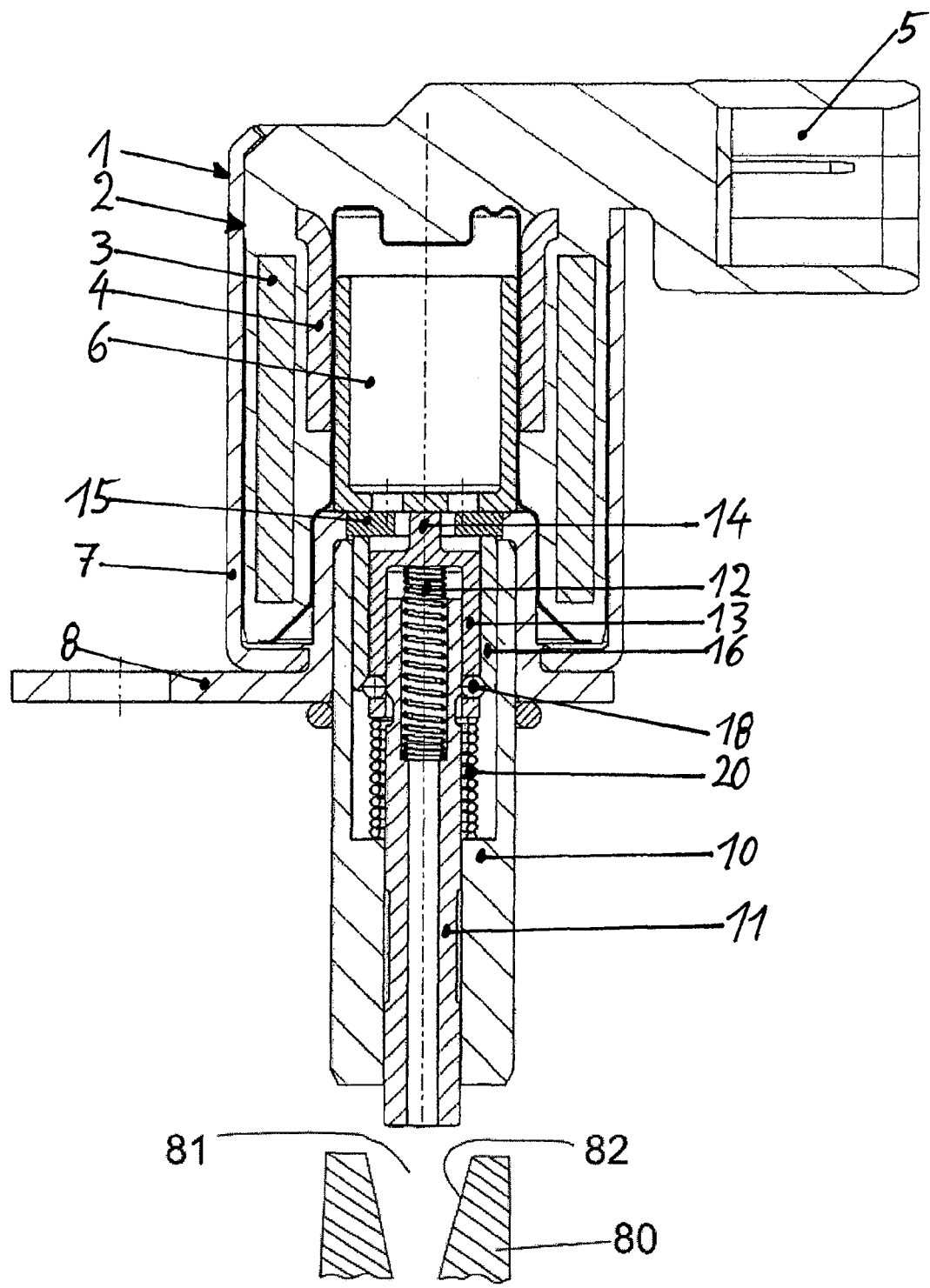
FIG. 2 shows a sectional view of the actuator unit according to FIG. 1, having a withdrawn actuator pin.
Figure 4:
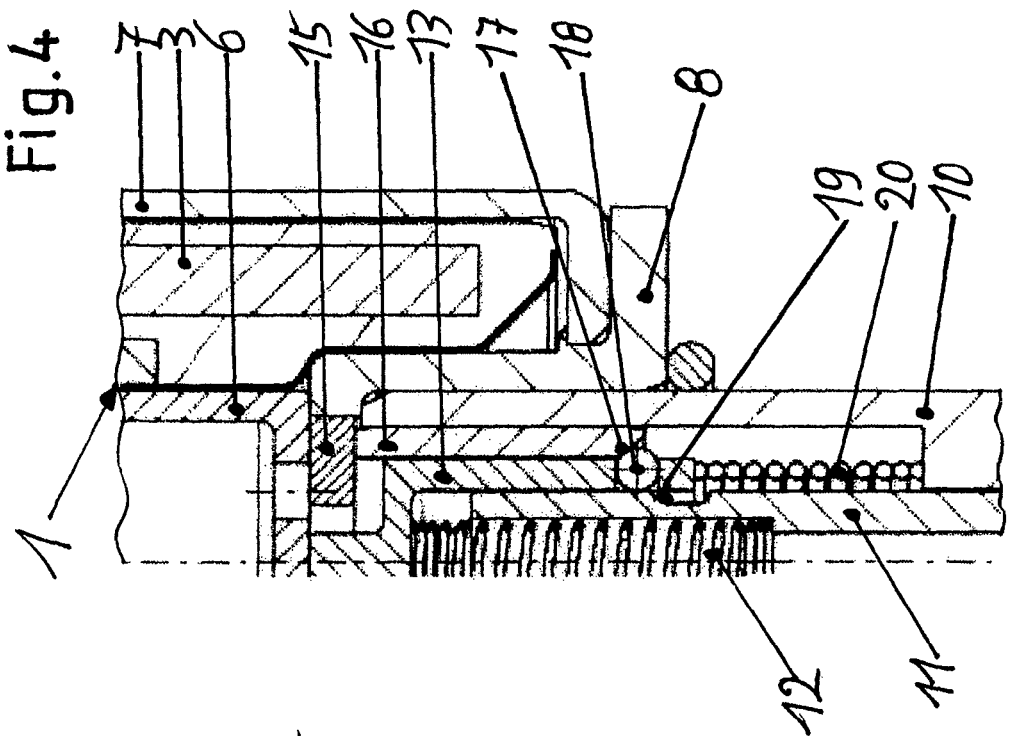
FIG. 4 shows an enlarged section of the actuator unit according to FIG. 2.
Figure 3:
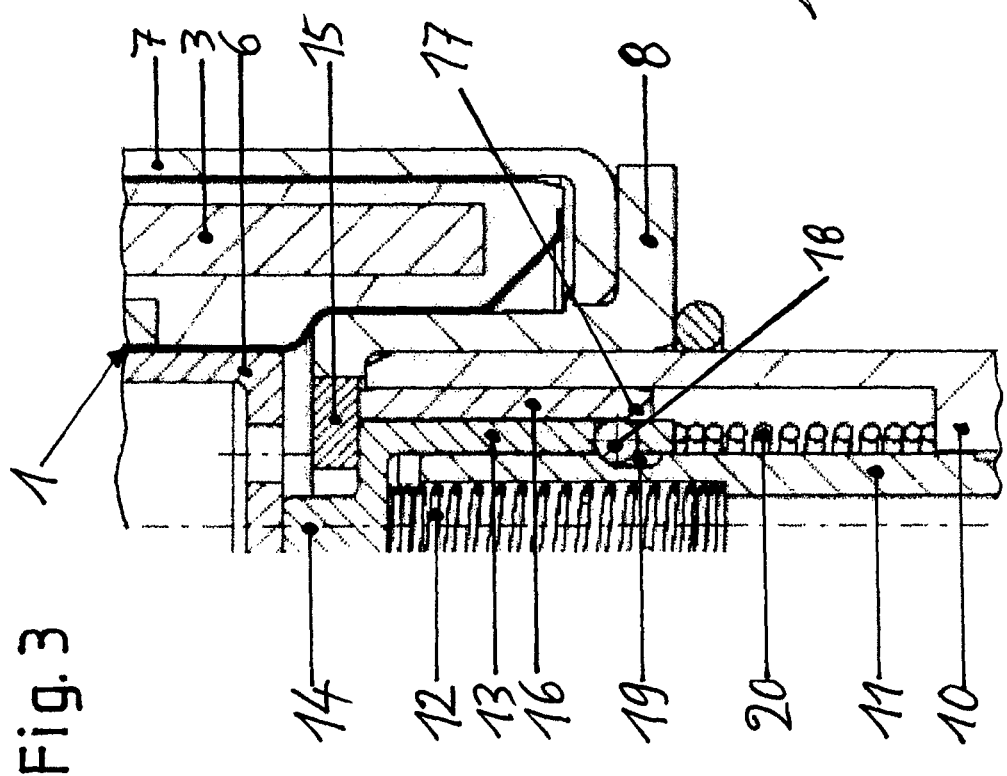
FIG. 3 shows an enlarged section of the actuator unit according to FIG. 1.

Due to this inventive embodiment, it is achieved that, once the actuator pin is lifted by the ejection ramp 82 of a sliding groove 81 of a sliding cam system 80, all shown schematically in FIG. 2, to the extend that recess 19 is located at the height of chamfers 17, return stroke spring 20 takes over the rest of the inward movement by moving shifting gate 13 in the direction of electromagnet unit 2, and latching element 18 moves over chamfer 17 into recess 19 and continues to lift the actuator pin until shifting gate 13 rests against disk 15.

The outward movement of the actuator pin is initiated by armature 6, which pushes shifting gate 13 outward until latching elements 18 release recesses 19 via chamfer 17 in such a way that actuating spring 12 moves actuator pins 11 all the way to the outside.

LIST OF REFERENCE NUMERALS

1 Actuator unit
2 Electromagnet unit
3 Coil
4 Armature guide
5 Connector
6 Armature
7 Outer housing
8 Fixing flange
10 Housing
11 Actuator pin
12 Actuating spring
13 Shifting gate
14 Dome
15 Disk
16 Bushing
17 Chamfer
18 Latching element
19 Recess
20 Return stroke spring
80 sliding cam system
81 sliding groove
82 ejection ramp

What is claimed is:

1. An actuator unit of a sliding cam system fixable to an internal combustion engine or to a component thereof, the actuator unit comprising:
    at least one actuator pin for moving sliding cam units of the sliding cam system into different axial positions with the aid of at least one sliding groove on a circumference of the sliding cam units, which interacts with the actuator pin and which has at least one ejection ramp,
    the sliding cam system including an electromagnet unit, the at least one actuator pin loaded in the direction of the sliding cam unit by an actuating spring slidingly guided in a housing of the actuator unit, and the actuator pin or at least one component connected thereto being operatively connected to a latching device with latching elements guided in a shifting gate, the shifting gate being spring-loaded by a spring and being actuatable by the electromagnet unit,
    the spring of the shifting gate being a return stroke spring supported on the housing and loading the shifting gate in the insertion direction of the actuator pins, a force of the return stroke spring being greater than a force of the actuating spring,
    wherein the latching elements are operatively connected to a recess on the actuator pin and to a chamfer, and
    wherein the chamfer is situated on a bushing surrounding the shifting gate.

2. The actuator unit as recited in claim 1 wherein the at least one actuator pin includes a plurality of actuator pins.

3. The actuator unit as recited in claim 1 wherein the chamfer is conical.

4. The actuator unit as recited in claim 1 wherein the latching elements are spheres.

5. The actuator unit as recited in claim 1 wherein the bushing is guided in the housing.

6. The actuator unit as recited in claim 1 wherein the shifting gate has a dome contactable by an armature of the electromagnet unit.

7. The actuator unit as recited in claim 6 wherein the dome is movable against the force of the return stroke spring by the armature of the electromagnet unit.

8. The actuator unit as recited in claim 1 further comprising a disk guided in a fixing flange and having an opening for a dome, the disk being provided at a connection to a bushing surrounding the shifting gate.

9. The actuator unit as recited in claim 8 wherein the housing is fixed in the fixing flange.

10. The actuator unit as recited in claim 9 wherein the housing is fixed to the fixing flange via a press-fit connection.

11. The actuator unit as recited in claim 1 wherein the electromagnetic unit includes a coil, an armature guide and a connector.

12. The actuator unit as recited in claim 11 wherein the electromagnetic unit is a single production unit manufactured by a plastic injection molding operation.

13. The actuator unit as recited in claim 12 wherein the production unit is situated in an outer housing.

14. The actuator unit as recited in claim 13 wherein the outer housing is fixed to the fixing flange with the aid of caulking.

15. An actuator unit of a sliding cam system fixable to an internal combustion engine or to a component thereof, the actuator unit comprising:
    at least one actuator pin for moving sliding cam units of the sliding cam system into different axial positions with the aid of at least one sliding groove on a circumference of the sliding cam units, which interacts with the actuator pin and which has at least one ejection ramp, the sliding cam system including an electromagnet unit, the at least one actuator pin loaded in the direction of the sliding cam unit by an actuating spring slidingly guided in a housing of the actuator unit, and the actuator pin or at least one component connected thereto being operatively connected to a latching device with latching elements guided in a shifting gate, the shifting gate being spring-loaded by a spring and being actuatable by the electromagnet unit, the spring of the shifting gate being a return stroke spring supported on the housing and loading the shifting gate in the insertion direction of the actuator pins, a force of the return stroke spring being greater than a force of the actuating spring, further comprising a disk guided in a fixing flange and having an opening for a dome, the disk being provided at a connection to a bushing surrounding the shifting gate.

16. The actuator unit as recited in claim 15 wherein the housing is fixed in the fixing flange.

17. The actuator unit as recited in claim 16 wherein the housing is fixed to the fixing flange via a press-fit connection.

18. An actuator unit of a sliding cam system fixable to an internal combustion engine or to a component thereof, the actuator unit comprising:

at least one actuator pin for moving sliding cam units of the sliding cam system into different axial positions with the aid of at least one sliding groove on a circumference of the sliding cam units, which interacts with the actuator pin and which has at least one ejection ramp, the sliding cam system including an electromagnet unit, the at least one actuator pin loaded in the direction of the sliding cam unit by an actuating spring slidingly guided in a housing of the actuator unit, and the actuator pin or at least one component connected thereto being operatively connected to a latching device with latching elements guided in a shifting gate, the shifting gate being spring-loaded by a spring and being actuatable by the electromagnet unit, the spring of the shifting gate being a return stroke spring supported on the housing and loading the shifting gate in the insertion direction of the actuator pins, a force of the return stroke spring being greater than a force of the actuating spring, wherein the electromagnetic unit includes a coil, an armature guide and a connector.

19. The actuator unit as recited in claim 18 wherein the electromagnetic unit is a single production unit manufactured by a plastic injection molding operation.

20. The actuator unit as recited in claim 19 wherein the production unit is situated in an outer housing.

21. The actuator unit as recited in claim 20 wherein the outer housing is fixed to the fixing flange with the aid of caulking.

* * * * *